US009933273B2

(12) United States Patent
Pandya et al.

(10) Patent No.: US 9,933,273 B2
(45) Date of Patent: Apr. 3, 2018

(54) METHOD AND APPARATUS FOR POINT OF INTEREST EVALUATION

(75) Inventors: Ritesh Pandya, Rochester Hills, MI (US); Charles Michael Broadwater, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 13/558,745

(22) Filed: Jul. 26, 2012

(65) Prior Publication Data

US 2014/0032101 A1 Jan. 30, 2014

(51) Int. Cl.
G01C 21/36 (2006.01)
G06F 17/30 (2006.01)
G01C 21/34 (2006.01)
G01S 19/42 (2010.01)
G01C 21/32 (2006.01)
(Continued)

(52) U.S. Cl.
CPC ..... G01C 21/3679 (2013.01); G06F 17/3087 (2013.01); G06F 17/30241 (2013.01); B60Q 1/48 (2013.01); G01C 21/00 (2013.01); G01C 21/32 (2013.01); G01C 21/34 (2013.01); G01C 21/36 (2013.01); G01C 21/3614 (2013.01); G01G 1/14 (2013.01); G01S 1/00 (2013.01); G01S 19/42 (2013.01); G06F 15/16 (2013.01)

(58) Field of Classification Search
CPC ............ G01C 21/3682; G01C 21/3614; G01C 21/367; G01C 21/3611; G01C 21/3641; G01C 21/3446; G01C 21/32; G01C 21/00; G01C 21/36; G01C 21/3679; G01C 21/26; G01C 21/3673; G01C 21/34; G01C 21/3476; G06K 9/00791; G06K 9/00818; G01S 19/42; G01S 1/00; B60Q 1/48; G08G 1/14; G08G 1/0112; G08G 1/0129; G08G 1/0141; G08G 1/04; G08G 1/143; G08G 1/144; G08G 1/146; G08G 1/147; G08G 1/207; G06F 15/16
USPC ....... 701/431, 426, 410, 454, 533, 516, 461, 701/469; 340/995.19, 932.2; 715/781
See application file for complete search history.

(56) References Cited

U.S. PATENT DOCUMENTS 6,542,814 B2   4/2003   Polidi et al.
6,839,628 B1   1/2005   Tu
(Continued)

FOREIGN PATENT DOCUMENTS

EP   2180293 A2   4/2010
JP   2011095062 A   5/2011
WO   2008056882 A1   5/2008

Primary Examiner — Behrang Badii
(74) Attorney, Agent, or Firm — Jennifer Stec; Brooks Kushman P.C.

(57) ABSTRACT

A system includes a navigation device and a processor in communication with the navigation device and an output. The processor is configured to receive a plurality of POIs. The processor is also configured to search for at least a first of the POIs in first proximity to a route in the navigation device. Further, the processor is configured to, subsequent to the search for a first POI in first proximity, for each instance of the first POI in first proximity to the route, search for at least a second of the POIs in second proximity to the first POI. The processor is also configured to output any instances wherein each of the POIs are found to be in second proximity to at least one of the other POIs of the plurality of POIs.

11 Claims, 3 Drawing Sheets

(51) Int. Cl.
  *G01C 21/00*  (2006.01)
  *G01G 1/14*  (2006.01)
  *B60Q 1/48*  (2006.01)
  *G01S 1/00*  (2006.01)
  *G06F 15/16*  (2006.01)

(56) References Cited

U.S. PATENT DOCUMENTS

| | | | |
|---|---|---|---|
| 7,689,355 B2 | 3/2010 | Abernethy, Jr. et al. | |
| 2004/0260465 A1* | 12/2004 | Tu | G01C 21/3679 701/426 |
| 2006/0241857 A1* | 10/2006 | Onishi | G01C 21/3446 701/533 |
| 2008/0228385 A1* | 9/2008 | Geelen | G01C 21/3641 701/533 |
| 2009/0171584 A1* | 7/2009 | Liu | G01C 21/3611 701/469 |
| 2010/0125406 A1 | 5/2010 | Prehofer | |
| 2010/0138151 A1 | 6/2010 | Jang et al. | |
| 2010/0268448 A1* | 10/2010 | Doan | G01C 21/367 701/533 |
| 2011/0071758 A1* | 3/2011 | Cho | G01C 21/3682 701/431 |
| 2011/0125398 A1* | 5/2011 | Bos | G01C 21/3611 701/465 |
| 2011/0130959 A1* | 6/2011 | Hwang | G01C 21/3614 701/533 |
| 2012/0062395 A1* | 3/2012 | Sonnabend | G06K 9/00791 340/932.2 |
| 2012/0283946 A1* | 11/2012 | Doan | G01C 21/367 701/461 |

* cited by examiner

US 9,933,273 B2

METHOD AND APPARATUS FOR POINT OF INTEREST EVALUATION

TECHNICAL FIELD

The illustrative embodiments relate to methods and apparatus for point of interest evaluation.

BACKGROUND

With the advent of portable navigation technology, GPS sensitive devices have begun to pop up in vehicles, pockets and even on the wrists of people all over the world. These devices can be as simple as providing GPS coordinates, or can access complex databases full of businesses, street names, parks, waterways and other relevant locations.

Typically, in a vehicle-context, the device will have at least a street database, which can be used to provide directions to a known address. In some cases, the database may also include business and local attraction names (parks, museums, etc.) allowing a user to look up and access information on how to travel to these specific locations.

As these devices have evolved, attempts have been made to improve on the initial direction-providing capability of the devices. For example, U.S. Pat. No. 6,542,814 discusses a computer implemented method and apparatus for providing a display of points of interest in conjunction with a vehicle navigation system. A vehicle navigation system is provided and includes a processor configured to identify and display a plurality of points of interest with reference to a vehicle's location, and to repeat the display to reflect changes in the vehicle's location. In another embodiment, the vehicle navigation system includes a processor configured so that the plurality of points of interest identified is within a radius of the current position when the current location is within a densely digitized area. When the vehicle is not within a densely digitized area, the plurality of points of interest lie ahead along the current road within a second distance.

Similarly, U.S. Patent Application 2010/0125406 discusses methods, apparatuses, and computer program products for providing point of interest navigation services. An apparatus may include a processor configured to receive a request for navigation instructions comprising an origin location and a destination location. The processor may be further configured to determine a route between the origin location and the destination location. The processor may additionally be configured to determine one or more points of interest along the route based at least in part upon prior usage data associated with each point of interest. The prior usage data may be received and aggregated from users of a navigation system. The processor may also be configured to provide navigation instructions comprising the one or more determined points of interest. Corresponding methods and computer program products are also provided.

SUMMARY

In a first illustrative embodiment, a system includes a navigation device and a processor in communication with the navigation device and an output. The processor is configured to receive a plurality of POIs. The processor is also configured to search for at least a first of the POIs in first proximity to a route in the navigation device. Further, the processor is configured to, subsequent to the search for a first POI in first proximity, for each instance of the first POI in first proximity to the route, search for at least a second of the POIs in second proximity to the first POI. The processor is also configured to output any instances wherein each of the POIs are found to be in second proximity to at least one of the other POIs of the plurality of POIs.

In a second illustrative embodiment, a system includes a processor, configured to receive input corresponding to two or more POIs. The processor is also configured to search within a first proximity of a known route for all of the two or more POIs. Also, the processor is configured to output all instances wherein each of the two or more POIs is within second proximity to at least one of the other POIs and at least one of the POIs is within first proximity of the known route.

In a third illustrative embodiment, a computer-implemented method includes searching for at least a first of the POIs in first proximity to a known route utilizing a vehicle computing system (VCS). The method also includes, subsequent to the searching for a first POI in first proximity, for each instance of the first POI in first proximity to the route, searching for at least a second of the POIs in second proximity to the first POI. Further, the method includes outputting any instances wherein each of the POIs are found to be in second proximity to at least one of the other POIs of the plurality of POIs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
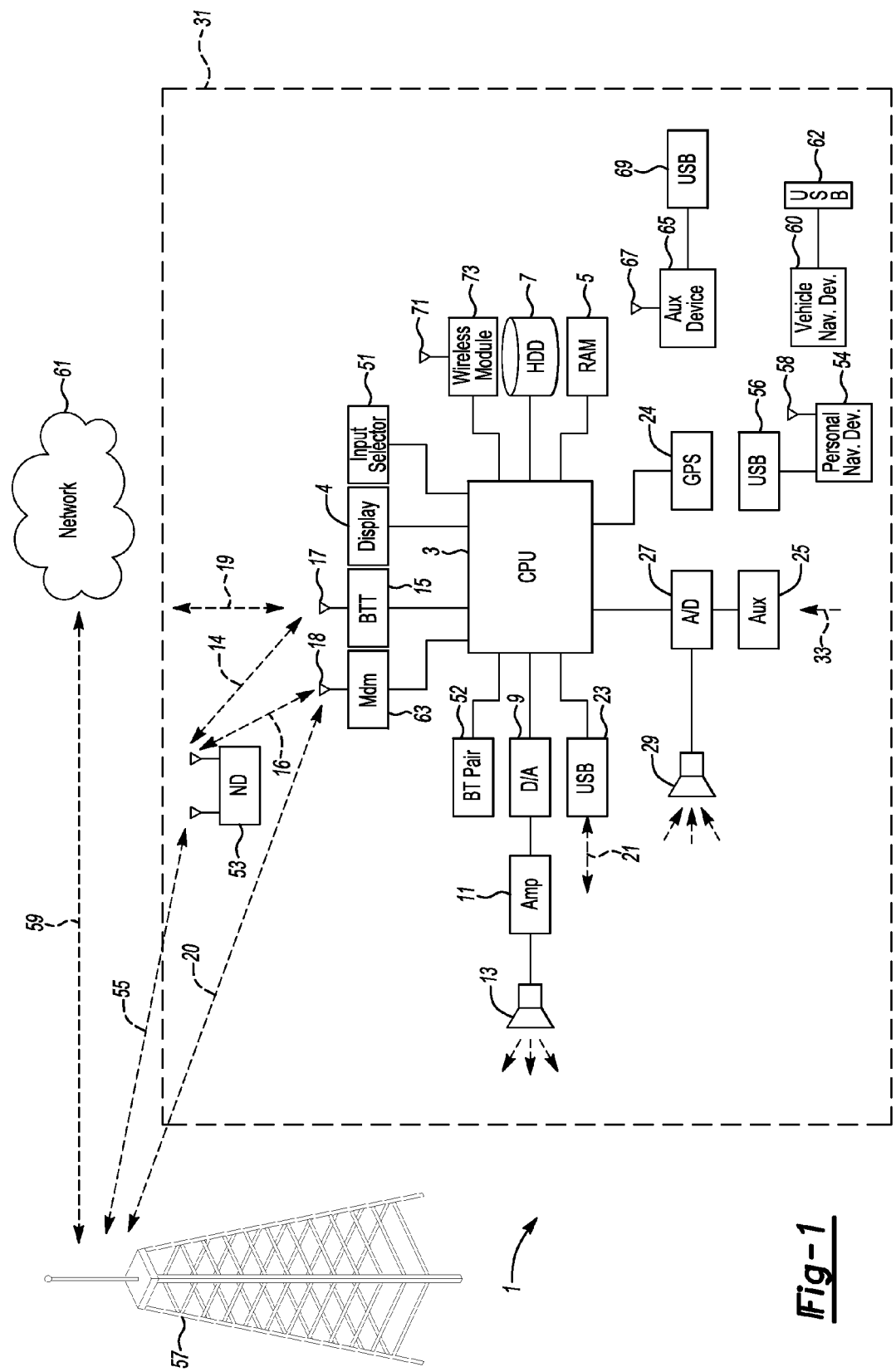
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Although many improvements have been made on the way that navigation devices function, there still remains a great deal of room to even further improve navigation, especially in a vehicle.

Often a person in a vehicle will be traveling a route that can last for thirty minutes or more. During such travels, gasoline, food and even casual or necessary goods shopping may be desired. Typically, along a given route, there may be numerous places where such purchases can be made. Gas stations, restaurants and shopping plazas provide many opportunities for purchasing a variety of goods and services.

Although there may be a number of possible locations, any particular driver may have a few specific locations in mind. For example, if a driver had an Exxon gasoline credit card and a desire for hamburgers, the driver may want to stop at an Exxon station for a fill-up and a McDonalds for lunch. On a given route, there may be only a limited number of Exxon stations and McDonalds.

Further, the driver may wish to make both stops at the same time, especially if the stops require the driver to leave a freeway or other route of high-speed travel. Along the same route as above, there may be only a single location that has both of the desired locations in some relative proximity.

In another example, the driver may be indifferent about where gasoline is obtained, but may still want McDonalds. Or, for example, may just want hamburgers. In this example, the driver may be content to stop at any gas station that has a hamburger place in close proximity, regardless of the particular brands.

Problems like the above are difficult to solve utilizing conventional point of interest (POI) technology. In many cases, the driver would first have to select one or more of the gas stations, review or write down their addresses, then select various hamburger places, do the same with those addresses, then determine if any of the two addresses are proximate to each other. This, of course, is far too much of a hassle to do while driving, not to mention dangerous.

Some navigation devices let a driver find a POI that is proximate to a destination. In these systems, the driver would have to select a particular gas station as a destination, and then search to see if there were any hamburger places near that destination. Unfortunately, if there were not, the driver would then have to repeat this process, possibly a number of times, for additional gas stations. Again, this is a time consuming and potentially dangerous process to perform while driving, and even if the vehicle is parked, the amount of time spent on this process could far outweigh the amount of time saved by coordinating the stops.

Figure 2:
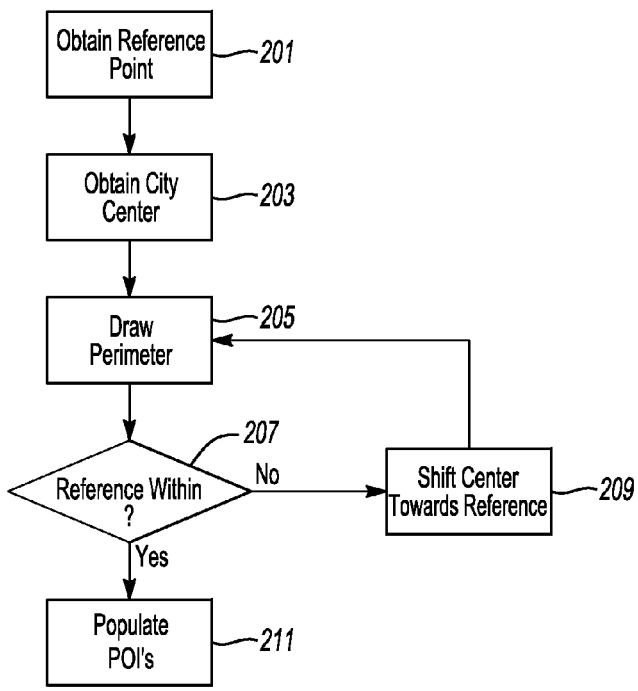
FIG. 2 shows an illustrative process for determining POIs proximate to a desired reference point.

FIG. 2 shows an illustrative process for determining POIs proximate to a desired reference point and a city center. In this illustrative example, the process may desire to build an index of other POIs around a city center, a particular reference point, or both. One non-limiting example of why an index may be desired is the ability to smart-spell a particular POI. For example, without limitation, if an index only contained three businesses that had "Pu" as the first two letters, once the user had typed in these letters the appropriate businesses could be presented. On the other hand, utilizing the entire database of POIs could produce literally thousands of POIs whose names begin with Pu.

In this illustrative example, the process obtains a reference point from a user 201. This reference point corresponds to a particular location within a city to which the user may wish to travel. It can be an end destination or just a stopping point along a way.

Next, in this illustrative example, the process obtains a city center reference point 203. The definition of a city center is always somewhat of an arbitrary thing, as there are few cities where someone couldn't argue that one point was more "central" than another, but for navigation purposes, a "city center" may be previously defined.

Around the city center, a perimeter is drawn 205. This perimeter in one instance can be drawn large enough to ensure that it encompasses the POI. For example, the process (not shown here) could determine the distance from the city center to the POI, and draw a perimeter around that distance at a minimum. Unfortunately, if the city is a fairly large city, this could result in a pre-populated database that still has thousands of businesses therein.

In the example, shown, a perimeter of previously determined (or determined dynamically by, for example, city size) is drawn around the city center. It is then determined if an instance of the reference POI is within this perimeter 207. If the reference POI is within the perimeter, the search is over and the database of businesses proximate to both a city center and the POI can be populated 211.

If the perimeter does not encompass the city center, the process can shift the "location" of the city center to a point closer to a known POI 209. A perimeter can again be drawn, to determine if the POI is within the perimeter (of course, sufficient shift to ensure this is true after one iteration could also be done). This draws a perimeter and database population around a new city center, but a point that is closer to the original city center than, for example, the POI itself would have been.

Once the reference POI is within the perimeter, the database can be populated.

This search and population is useful in a variety of scenarios. For example, if the reference POI was a relative's house, the user could know a number of business proximate to both the relative's house and the city center (which, for the sake of this patent, is presumed to be somewhat relevant as to the location of many interesting other attractions in a given city). This could aid in deciding where to eat or what attractions to go see in a given locality.

In another example, the driver may have input Exxon in Royal Oak, Mich., and still wish to eat at a McDonalds. By populating this database, the process can determine if there are any McDonalds within proximity to the Exxon in Royal Oak, and also proximate to the city center. Then, simply by typing "Mc", the driver is likely to have such a limited subset of businesses starting with "Mc" that the name McDonalds will pop up in the list if one exists within the perimeter. If not, the driver need search no further, and can instead enter a different gas station name.

Figure 3:
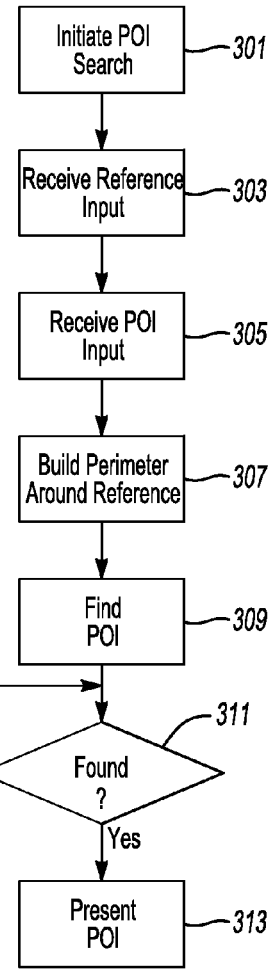
FIG. 3 shows an illustrative process for determining the proximity of a POI to a given reference point.

FIG. 3 shows an illustrative process for determining the proximity of a POI to a given reference point. In this illustrative example, a process will receive a first point (POI/destination, etc.) as a reference point, and then determine how proximate a second POI is to the first reference point. That is, instead of determining proximity to a location and a city center, as above, the process will search until the closest version of the second POI is found.

In this illustrative example, the process initiates a search for POIs around a reference point 301. The reference point is received by the process 303. As noted, this could be a destination, another POI, an address, GPS coordinates, etc. In conjunction with the reference point, the process receives POI input 305 relating to a secondary POI.

For example, a first reference point could be a hotel address for a possible trip, and the second POI could be for a movie theater. The search would then result in presentation of the closest movie theater to the first input point of reference.

In this example, once the secondary POI has been received, the process builds a perimeter around the first reference point. This perimeter can then be searched for the second POI. If the POI is found 311, the location of the POI can be presented 313. If the POI is not found, the perimeter can be expanded 315 and the search can continue. As the perimeter is expanded, a database is populated with businesses and other POIs within the perimeter. Thus, if tertiary or additional other POIs are later searched, this database can be used for fast access and smart spelling of the names of these tertiary POIs. If a tertiary POI happens to be outside the current perimeter, the perimeter can simply be expanded again (up to a maximum, if desired) until the tertiary POI is found. Once again, a larger but still controlled database of local POIs within the perimeter will result.

Figure 4:
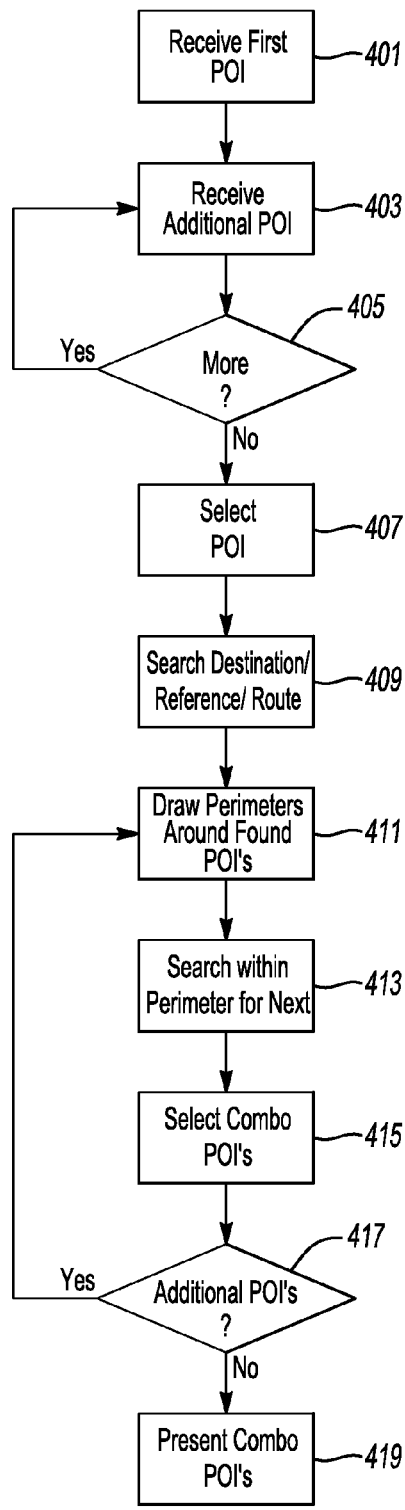
FIG. 4 shows an illustrative process for finding a POI proximate to other POIs.

FIG. 4 shows an illustrative process for finding a POI proximate to other POIs. In this illustrative example, the process will search for groupings of two or more POIs that are proximate to each other and near a destination or along a route. Resulting from this search may be one or more towns or other locations where all the desired POIs are clustered within an acceptable distance of each other (which can be dynamically set or predetermined, as a manufacturer desires).

In this illustrative example, the process may receive input of a first POI in a set 401, and at least a second POI 403. While the example above listed Exxon and McDonalds, the user may have additional interests of purchase as well. Accordingly, the option to input further POIs may also exist 405. If no suitable spot where the appropriate combination exists can be found, the user could always reduce the overall number of POIs until a proper combination could be found. Exempted POIs could be dealt with individually or in smaller groups. In at least one example, if three or more POIs are input, the system could not only show any groupings of all three, but one or more subsets where some number less than the total of POIs could be found near the destination or along the route.

In order to do the search, in this example, the process selects one of the input POIs 409. This selection can be arbitrary, or could correspond, for example, to a first input POI or some ordering of POIs in order of importance (e.g., gas is more important than food on a long trip).

The process then searches along a route and at a destination (within some proximity to each) for at least one instance of the selected POI 409. For each found example of the POI, the process then draws a perimeter around the POI 411, and searches within that perimeter for a next of the input POIs 413. This will allow the process to find all instances of both first two POIs within a certain proximity to each other. Of course, if no instances are found, the perimeter can be expanded if desired, until the first instance of a proximate two POIs is found (or until other preferences/limits are met).

All POIs within a give perimeter of each other are then selected as possible stopping points 415, and the process checks to see if there is a third or further additional POI remaining for consideration 417. If there is an additional POI, the process may take a few approaches. In one example, new perimeters may be drawn around both (or more) of the POIs in each grouping, and the same searching process can be repeated. In another example, the process may choose a point between the POIs already found and use that as a reference around which to draw a perimeter. The first option may have more success, since a larger area may be covered, but may also suffer from finding a "correct" location for, for example, five POIs, even though each is only close to one of the other POIs (essentially a long string of POIs). Such a result could take a user far from an original route.

Other solutions may also be possible, but whatever search solution is used, all groupings matching that solution may then be presented to a user 419. Thus, for a five hour journey, for example, using the POIs from above, all exits from a highway and within proximity to the highway may be shown if they have both an Exxon and a McDonalds in proximity to each other.

In at least one example, proximities to a route and given cities may vary. That is, along a given route, 94% of the route may be along a highway. In that case, the system may look no further than two miles from the highway along either side. But, the route may pass through and/or end in a number of cities. In those instances (or simply at the endpoint), the process may draw a larger or smaller perimeter in searching for an initial matching POI.

Figure 5:
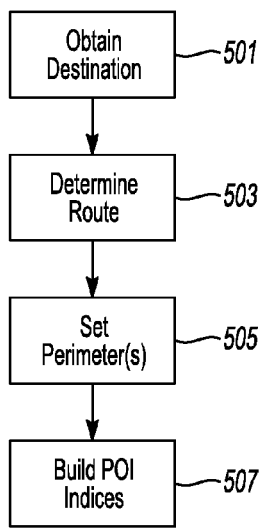
FIG. 5 shows an illustrative example for building indices of POIs along a given route.

FIG. 5 shows an illustrative example for building indices of POIs along a given route. In this illustrative example, a database of POIs along a route may be populated, such that while the route is being traveled, smart searching and quick referencing of POIs along the route can be performed.

In this example, the process receives a destination 501 and determines a route to the destination 503. Once the route is known, the process sets one or more perimeters along the route and around the destination as needed 505. The size of perimeters may change, as noted above, depending on, for example, features of portions of the route. Perimeters can also be designated in any of the above cases by time instead of distance (e.g., all locations five minutes or less from a route).

Once the perimeters have been determined, the process will then build POI indices within those perimeters, providing a limited scope database that has better capacity for quick searching and smart-spelling entry of POI names.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive user-input into a vehicle computing system defining two points of interest (POI)s;
search for a first POI in first proximity to a current route saved in the vehicle computing system;
subsequent to the first POI search, for each of a plurality of found first POIs, automatically search for a second POI in second, user-input, via the vehicle system, proximity to the first POI;
output, on a vehicle display, instances wherein the second POI is found to be in second proximity to the first POI; and
wherein the output is limited to instances wherein each of the POIs is within second proximity to a point central to at least two of the other POIs from the plurality of POIs.

2. The system of claim 1, wherein the first proximity is user-definable.

3. The system of claim 1, wherein the first proximity varies depending on one or more features of a portion of a route.

4. The system of claim 1, wherein the processor is further configured to expand the second proximity, if no instances of each of the POIs being within the second proximity to at least one of the other POIs of the plurality of POIs is found.

5. The system of claim 1, wherein the output is limited to instances whereineach of the POIs is within second proximity to all of the others of the POIs from the plurality of POIs.

6. A system comprising:
a processor, configured to:
receive user-input, into a vehicle system, corresponding to two points of interest (POI)s,
search within a first proximity of a current route, saved in the vehicle system, for both of the input POIs,
output, via a vehicle display, a plurality of instances wherein both POIs are within a second, user-input proximity to each other and at least one of the POIs is within first proximity of the known route, and
wherein the output is limited to instances wherein each of the POIs is within second proximity to a point central to at least two of the other POIs from the plurality of POIs.

7. The system of claim 6, wherein the output is limited to instances wherein both of the POIs are also within a first proximity of the known route.

8. A computer-implemented method comprising:
searching for at least a first of two user-input POIs, input using a vehicle computing system, in first proximity to a current route, saved in the vehicle computing system, utilizing a vehicle computing system;
subsequent to searching for a first POI, for each of a plurality of instances of a found first POI, automatically searching, using the vehicle computing system, for a second POI in second, user-input proximity to the first POI;
outputting instances on a vehicle display wherein the second POI is in second proximity to the first POI; and
wherein the output is limited to instances wherein each of the POIs is within second proximity to a point central to at least two of the other POIs from the plurality of POIs.

9. The method of claim 8, wherein the first proximity is user-definable.

10. The method of claim 8, wherein the first proximity varies depending on one or more features of a portion of a route.

11. The method of claim 8, further including expanding the second proximity, if no instances of each of the POIs being within the second proximity to at least one of the other POIs of the plurality of POIs is found.

* * * * *